(12) United States Patent
Bachman

(10) Patent No.: US 6,315,196 B1
(45) Date of Patent: Nov. 13, 2001

(54) METHOD AND SYSTEM FOR DEBT DEFERMENT

(75) Inventor: Richard Bachman, Scarsdale, NY (US)

(73) Assignee: Citibank, N.A., New York, NY (US)

( * ) Notice: Subject to any disclaimer, the term of this patent is extended or adjusted under 35 U.S.C. 154(b) by 0 days.

(21) Appl. No.: 09/301,247

(22) Filed: Apr. 28, 1999

Related U.S. Application Data
(60) Provisional application No. 60/083,097, filed on Apr. 28, 1998.

(51) Int. Cl.[7] .................................................. G06K 5/00
(52) U.S. Cl. ............................. 235/380; 705/41; 705/39
(58) Field of Search ............................ 705/41, 39, 40; 235/380, 382, 375; 379/144

(56) References Cited

U.S. PATENT DOCUMENTS

| | | | |
|---|---|---|---|
| 4,491,725 | 1/1985 | Pritchard | 235/375 |
| 4,648,037 | 3/1987 | Valentino | 364/408 |
| 4,750,121 | 6/1988 | Halley et al. | 364/408 |
| 4,752,877 | 6/1988 | Roberts et al. | 364/408 |
| 4,858,121 | 8/1989 | Barber et al. | 364/406 |
| 5,191,522 | 3/1993 | Bosco et al. | 364/401 |
| 5,523,942 | 6/1996 | Tyler et al. | 364/401 |
| 5,590,037 | 12/1996 | Ryan et al. | 395/204 |
| 5,600,554 | 2/1997 | Williams | 395/201 |
| 5,613,072 | 3/1997 | Hammond et al. | 395/204 |
| 5,655,085 | 8/1997 | Ryan et al. | 364/401 R |
| 5,673,402 | 9/1997 | Ryan et al. | 395/238 |
| 5,774,883 | 6/1998 | Andersen et al. | 205/38 |
| 5,864,830 * | 1/1999 | Armetta et al. | 705/41 |
| 6,012,047 * | 1/2000 | Mazonas et al. | 705/38 |

FOREIGN PATENT DOCUMENTS

10326317 A * 12/1998 (JP) .

OTHER PUBLICATIONS

Article entitled "A Closer Look at Credit–Card Insurance It May Be Smarter To Buy Ordinary Life Insurance, Consumer Advocate Says," Nancy Feigenbaum, *The Orlando Sentinel*, May 3, 1989, p. 11.
Article entitled "Insure More Than Your Bills Coverage For Credit Card and Utility Payments Is Costly In Itself," Susan Tompor, *Detroit Free Press*, Apr. 28, 1997, p. 4F.
Solicitation, dated Jul. 22, 1997, from Providian Bank.
Solicitation, dated Jul. 27, 1997, from Providian Bank.
Solicitation, dated Oct. 3, 1997, from Providian Bank.

* cited by examiner

Primary Examiner—Thien M. Le
(74) *Attorney, Agent, or Firm*—George T. Marcou; Kilpatrick Stockton LLP

(57) ABSTRACT

A computerized method and system for automatic deferment of debt on a credit account of a customer of a financial institution includes a credit protector system of the financial institution which receives a request for enrollment for the customer and automatically marks a file for the credit account with information about enrollment for activation of deferment of debt on the account upon verification of an event such as hospitalization, unemployment, disability or family leave of the customer. The account file is also marked with a maximum fee charge date counter which automatically prompts transmittal of a fee charge paid up notice to the customer when the maximum fee charge period expires. Information about verification of the event is transmitted to the credit protector system for the customer, and the credit protector system of the financial institution automatically marks the credit account file with an indicator for activation of a deferment benefit for the credit account, including for example, zeroing the minimum payment due. Likewise, the account file is also marked with a maximum benefit duration date counter, and the maximum benefit duration date counter automatically prompts the credit protector system of the financial institution to mark the account file with a benefit deactivation indicator when the maximum benefit period expires.

31 Claims, 14 Drawing Sheets

| | |
|---|---|
| 134 → | |
| | ACCOUNT NUMBER — 136 |
| | SOURCE CODE — 138 |
| | NAME — 140 |
| | ADDRESS — 142 |
| | BALANCE — 144 |
| | BILLING CYCLE — 146 |
| | PID (?) — 148 |
| | SBU (?) — 150 |
| | INTEREST — 152 |
| | FEES — 154 |
| | MINIMUM DUE — 156 |
| | ANNUAL PERCENTAGE RATE — 158 |
| | ENROLLMENT DATE — 160 |
| | CANCELLATION DATE — 162 |
| | STATUS CODE — 164 |
| | REASON CODE — 166 |

ENROLLMENT/CANCELLATION INFORMATION PASSED
BETWEEN FINANCIAL INSTITUTION AND ADMINISTRATOR

FIG 4

SAMPLE MESSAGES

Denied Enrollment - Need Signature

Thank you for your recent request for enrollment in our Credit Protection Program. Unfortunately, we are unable to enroll you until we receive your signature.
Please sign below and return this letter in the enclosed reply envelope.
( ) Yes. Please enroll me in the Credit Protection Program.
Signature: _____ Date / / .

Denied Enrollment - Ineligible State

Thank you for your recent request for enrollment in our Credit Protection Program. Unfortunately, at the present time this program is not available to residents of your area.

Canceled Enrollment

In accordance with the provisions of your Credit Protector Agreement, your enrollment was canceled because one or more of the following conditions currently exists on your Credit Account:
  A payment is past due.
  Your account has been closed.
If your account is past due, your enrollment will be automatically reinstated once we receive the minimum payment that brings your account current.
If your account has been closed, we will be unable to automatically reinstate your Credit Protector coverage.
If there are no valid cards on your account, you may request reinstatement of your Credit Protector coverage once valid cards have been sent to you.

Canceled -- Out of U.S.

In accordance with the provisions of your Credit Protector Agreement, your enrollment was canceled because your current address is not within the U.S.
The Credit Protector program is currently only offered to residents of the United States.

Canceled by Cardmember

As you requested, your Credit Protector coverage was canceled as of / / .
Sincerely

FIG 5

SAMPLE MESSAGES

Denied Enrollment - Closed Account

Thank you for your recent request for enrollment in our Credit Protection Program. Unfortunately, since your account is closed, we cannot honor your request.

Failed Enrollment - Account Status

Thank you for your recent request for enrollment in our Credit Protection Program. Unfortunately, we cannot enroll you in the program because your account is not in good standing.

Denied Enrollment - Credit Insurance

Thank you for your recent request to enroll in our Credit Protection Program. Unfortunately, we cannot enroll you in the program because you are currently enrolled in our Credit Insurance Program. If for some reason, you would like to switch to the Credit Protection Program, please call us at

24 Months Notice Program Ended

In accordance with the provisions of your Credit Protector Agreement, your coverage has ended as of / / . You are now required to make the minimum payment of $

7 Years Notice Program is Free

We are pleased to inform you that as of / / , your Credit Protector program will be provided to you free of charge on this account due to your seven year membership in the program. As of / / , Credit Protector will be protecting your account, free of charge, for as long as you carry your Credit Card.

FIG 6

SAMPLE MESSAGES AUTOMATICALLY GENERATED AND ADDED TO THE CARDMEMBER'S CREDIT ACCOUNT STATEMENTS

200

202 — Message denoting that account is in deferment. Appears every month.

> Credit Protector coverage is now active on your account.
> Please note that your card cannot be used at this time.
> No minimum payment is due.

204 — Message for 23rd month

> Please note that you have only one month left of Credit Protector provided you sent in your monthly verification.
> Your minimum payment will be due next month.

206 — Message for 24th month end of activation

> Credit Protector activation has ended on your account due to reaching the maximum 24 month coverage period.
> Your minimum payment is now due.

208 — Message for cancellation of enrollment

> Your enrollment in Credit Protector has been canceled on your account effective xx/xx/xx.

210 — Message for cancellation of activation

> Your Credit Protector activation period has ended as of xx/xx/xx. Your minimum payment is now due.

212 — Message for reinstatement of enrollment

> The Credit Protector enrollment has been reinstated on your account.

214 — Message for closed account

> The Credit Protector program has been canceled on your account.

FIG 9

| | |
|---|---|
| 216 → | DATE OF ENROLLMENT ← 218 |
| | DATE OF ACTIVATION ← 220 |
| | DATE OF DEACTIVATION ← 222 |
| | DATE OF REACTIVATION ← 224 |
| | DATE OF NOTIFICATION ← 226 |
| | DATE OF EVENT ← 228 |
| | 7 YEARS PAID UP DATE ← 230 |
| | TYPE OF DEFERMENT<br>FAMILY LEAVE<br>UNEMPLOYMENT<br>DISABILITY<br>HOSPITALIZATION ← 232 |
| | NUMBER OF ACTIVATIONS ← 234 |

FIG 10

CATEGORIES FOR TRACKING CREDIT PROTECTOR STATUS OF CREDIT ACCOUNTS BY FINANCIAL INSTITUTION

CATEGORIES OF INFORMATION BY WHICH THE CARDMEMBER'S CREDIT ACCOUNTS ARE TRACKED

METHOD AND SYSTEM FOR DEBT DEFERMENT

CROSS-REFERENCE TO RELATED APPLICATIONS

This application claims the benefit of U.S. Provisional Application No. 60/083,097, filed Apr. 28, 1998.

FIELD OF THE INVENTION

The present invention relates generally to the field of computerized debt deferment systems and, more particularly, to a system for automatically implementing and tracking a credit protection program.

BACKGROUND OF THE INVENTION

Credit insurance is currently available to protect the credit rating of credit card holders who are unable to make timely payments on their credit card accounts because of unforeseen circumstances such as disability, involuntary unemployment, family leave and death. Generally, such insurance makes payments to the insured cardmember's account and otherwise keeps the cardmember's credit account in good standing. Such credit insurance is relatively expensive and is heavily regulated.

There is a need for a credit protector program in which a cardmember can enroll for a small fee which provides for deferment of interest, fees, payments or adverse credit reporting on the cardmember's credit account during periods of unemployment, disability, hospitalization or family leave, and which operates in conjunction with the existing automated and computerized financial systems of a financial institution.

SUMMARY OF THE INVENTION

It is an object of the present invention to provide an automated or computerized credit protector system that includes files that are communicated to an administrator for the system that keeps track of cardmembers that are activating the deferment benefits of the system.

It is a further object of the present invention to provide a computerized credit protector system in which accounting of cardmembers who activate the benefits of the credit protector can be maintained in the financial institution's existing mainframe or other computer system.

It is another object of the present invention to provide such a system in which, when a cardmember activates the benefits of the credit protector, the mainframe or other system of the financial institution includes an indication that the credit account cannot be used during the duration of activation.

It is an additional object of the present invention to provide a system that interacts with existing hardware of the financial institution, such as a mainframe computer, in a seamless manner, so that customer service representatives of the financial institution are able to maintain their excellences in servicing cardmembers.

The method of the present invention is as follows. A cardmember enrolls in the program referred to as credit protector program and pays for the program monthly. The payment required is based on a fraction of the amount of credit protection provided, such as 49 cents per $100 of credit extended. After a predetermined term of participation in the program, for example a period of seven years, assuming that the customer has not activated the benefit of the program at any time during the seven years, the customer receives the benefit of the credit protector program for free for the remainder of the time that the customer's enrolled credit card account remains open. The customer no longer has to pay for the benefit of the credit protector.

In an embodiment of the present invention, the credit protector allows a cardmember to pay a fee, for example, of about 49 cents per $100 in average outstanding balance. The cardmember pays in a fee charge each month up to a maximum amount, such as $24.50 per month. Under the method of the present invention, if, during any time that the cardmember is in the program, the cardmember becomes involuntarily unemployed, disabled, hospitalized, or takes family leave, the cardmember can activate the benefit of the program for the enrolled credit card. In activating the benefit, the cardmember's account is frozen, and the cardmember does not have to pay any interest, any fees, or pay the institution extending credit any of the balance of the credit for the time that the cardmember has activated the benefit.

Thus, a benefit of the present invention is that the cardmember does not need to worry about paying the account during the time of benefit activation. Additionally, the activation protects the customer's credit rating on the credit card because during the time of activation of the benefit, no negative information is reported to any credit bureau about the customer; thus, from the credit bureau standpoint, the customer remains in good standing.

The present invention further provides a system that allows customers to enroll in the program in a number of different ways. Customers are able to enroll when they actually sign up for a credit card. Customers are able to enroll via solicitations made to cardmembers, for example, through the mail, over the phone, or with their billing statements. Customers also have the opportunity to enroll when they are issued their new cards: credit cards typically expire every couple of years, and when customers are physically sent new cards, they are given the opportunity to enroll in this program.

In an embodiment of the present invention, at any time that the customer needs to activate the benefit, the customer makes a phone call to an 800 number and speaks with an administrator of the program for the institution providing the benefit. Depending upon the customer's situation, the administrator may activate the customer on the phone—if the customer is able to prove to the administrator's satisfaction that the customer really has the support documentation for whatever it is they are articulating as their reason for activation. Alternatively, the customer is asked to submit paperwork prior to activation; for example, additional prior confirmation can be required, if necessary (e.g., involuntarily unemployed, disability, family leave, and/or hospitalization).

In an embodiment of the present invention, when a customer actually enrolls in the program, it is noted on their file systematically (e.g., electronically in a computer system), and the customer is sent all the information necessary and a welcome kit. In addition, the customer receives a simple agreement detailing the benefits of the program.

An embodiment of the present invention operates in conjunction with existing automated financial systems. Thus, when a customer benefit is activated, the system assures that when the customer receives a credit card bill or statement, the statement indicates that the customer owes the institution nothing in terms of their balance due for that month. However, the overall amount that the customer owes in total still remains; the statement just contains a zero minimum due for the given month when the benefit is activated. Therefore, the amount that the customer owes is essentially deferred, and no interest or fees are added to the amount that is owed while the customer is in activation. All of this information is automatically accounted for in the system so that customer service functions and other functions run smoothly, and when the customer calls the institution, service representatives know what the status of the account is.

As a result, if the customer is actually in activation, and even if not in activation, service representatives know that the customer is enrolled in the credit protector program. Additionally, the institution is able to account for the number of months when a customer is enrolled in the credit protector program, so that when the customer reaches a certain number of months, such as the 84-month mark, which is equivalent to seven years of being in the program, the customer is told that he or she is eligible and will receive the benefits of the program for free for the remainder of the enrollment as a customer, assuming that the customer's account remains in good standing.

An embodiment of the present invention includes an automated or computerized system. The system includes files that are communicated to an administrator for the system who keeps track of customers that are activating. For example, this accounting of customers may be maintained in an institution's existing mainframe system. Thus, when a customer benefit activates, the mainframe system includes an indication that the account cannot be used during the time of activation. As a result, automatically no additional charges are added to the credit card account when the credit protector is actually activated.

An embodiment of the present invention includes a system that interacts with existing institution hardware, such as a mainframe computer, in a seamless manner so that the financial institution and its customer service representatives are able to maintain their excellence in servicing the customer. Customer service is also immediately informed of the status of the customer's account.

The present invention is a tool to encourage customers to be loyal to the institution issuing the card and encourages customers to stay in the credit protector program. It also, on the face of it, clarifies that the credit protector program and product is not an insurance product, which is very important because credit protection is not insurance. The present invention includes benefits that an insurance product cannot offer because insurance typically must collect fees (e.g., premiums) in order to keep the policies active. Thus, the present invention provides advantages for non-insurance users of the invention, such as credit card businesses, that want to provide credit protection benefits without using insurance.

To achieve the stated and other features, advantages and objects of the present invention, an embodiment of the invention provides a method and system of debt deferment on at least one credit account of a customer of a financial institution. The method and system of an embodiment of the invention marks a file for at least one credit account of the customer or cardmember of the financial institution with information about enrollment for activation of deferment of debt on the account upon verification of an event. Information about verification of the event is transmitted for the customer to the financial institution, and the financial institution automatically marks the account file with an indicator for activation of the deferment of debt on the account.

Marking the file with the enrollment information is performed by the financial institution and preferably by a credit protector system of the financial institution. The credit protector system may be a server which may also be a mainframe computer.

The event which is verified and which causes the financial institution to mark the file with an indicator for activation of the deferment of debt includes either the customer or a household member of the customer becoming involuntarily unemployed, hospitalized, disabled, or on family leave. When the financial institution marks the account file with enrollment information for the customer, the file is also marked with a maximum fee charge date counter. Thus, while the customer is initially charged a monthly fee for the enrollment for a predetermined period of time, when the predetermined period expires, the maximum fee charge date counter automatically marks the account file with a fee charge paid up indicator and prompts transmittal of a fee charge paid up notice by the financial institution to the customer. Thereafter, the enrollment is free of any fee charge to the customer.

In an embodiment of the invention, when information about verification of the event is transmitted for the customer to the financial institution, the financial institution automatically marks the customer's account file with an indicator of activation of the deferment benefit. The deferment benefit includes zeroing the minimum payment due on the customer's account, no adverse credit reporting to credit bureaus and the like on the customer, no fees accruing on the customer's account, and no new credit card charges by the customer. Upon activation of the deferment benefit, the financial institution automatically sends a notification of activation of the benefit to the customer. When the financial institution marks the file with an indicator of activation, the file is also marked with a maximum benefit duration date counter.

Thus, when the predetermined maximum benefit period expires, the maximum benefit duration date counter automatically marks the account file with an indicator of deactivation of the deferment benefit for the customer, and prompts transmittal of a notice of deactivation of the deferment benefit by the financial institution to the customer. Alternatively, before the maximum benefit period expires, information about termination of the event, such as re-employment of the customer or household member or termination of the hospitalization, disability or family leave of the customer or household member may be sent for the customer to the financial institution, whereupon the financial institution automatically marks the customer's account file with an indicator of deactivation of the deferment benefit.

In an embodiment of the invention, an enrollment request may be sent for the customer to the financial institution through an enrollment channel of the financial institution such as a telemarketer, a direct mail coupon, a credit application, a bangtail, a customer representative on the telephone, a statement coupon, or a computer network by the customer at a terminal. The enrollment request may be sent to a credit protector system of the financial institution, which automatically processes the request for enrollment and automatically transmits the enrollment information for the customer to an administrator for the financial institution. Preferably, the information about verification of the event is transmitted by the customer to the administrator, confirmed by the administrator, and transmitted by the administrator to the credit protector system of the financial institution.

Upon receipt of the enrollment request, the administrator automatically sends a fulfillment kit for the enrollment to the customer, consisting of such items as a welcome letter, a contract, a statement of policies, and an 800 number for the administrator's customer service representative. The administrator may likewise be a server which may also be a mainframe computer, and may be a server or computer of the financial institution, or may be coupled to a server or computer of the financial institution. The enrollment may be canceled by the customer, or the financial institution may cancel the enrollment as the result of receiving adverse credit information about the customer. In either case, the financial institution automatically marks the customer's account file with information about cancellation of the enrollment and sends a notice of the cancellation to the customer. The customer may request re-enrollment after cancellation by the customer, or the financial institution may receive additional credit information about the customer, and the financial institution may mark the customer's account file with information about re-enrollment for deferment of debt on the account.

Additional objects, advantages and novel features of the invention will be set forth in part in the description which follows, and in part will become more apparent to those skilled in the art upon examination of the following and may be learned by practice of the invention.

BRIEF DESCRIPTION OF THE DRAWINGS

FIG. 4 is a table which demonstrates the categories of cardmember enrollment or cancellation information transmitted between the financial institution and the administrator for an embodiment of the present invention;

FIG. 5 is a table which illustrates sample messages automatically generated to the cardmember by the credit protector system for an embodiment of the present invention;

FIG. 6 is a continuation of the table of FIG. 5 and illustrates further sample messages automatically generated to the cardmember by the credit protector system for an embodiment of the present invention;

FIG. 9 is a table with illustrates sample statement messages automatically printed on the cardmember's credit card statements with information about the credit protection program for an embodiment of the present invention;

FIG. 10 is a table which demonstrates categories of information about the cardmember's credit protection status tracked by the financial institution for an embodiment of the present invention;

DETAILED DESCRIPTION

Figure 1:
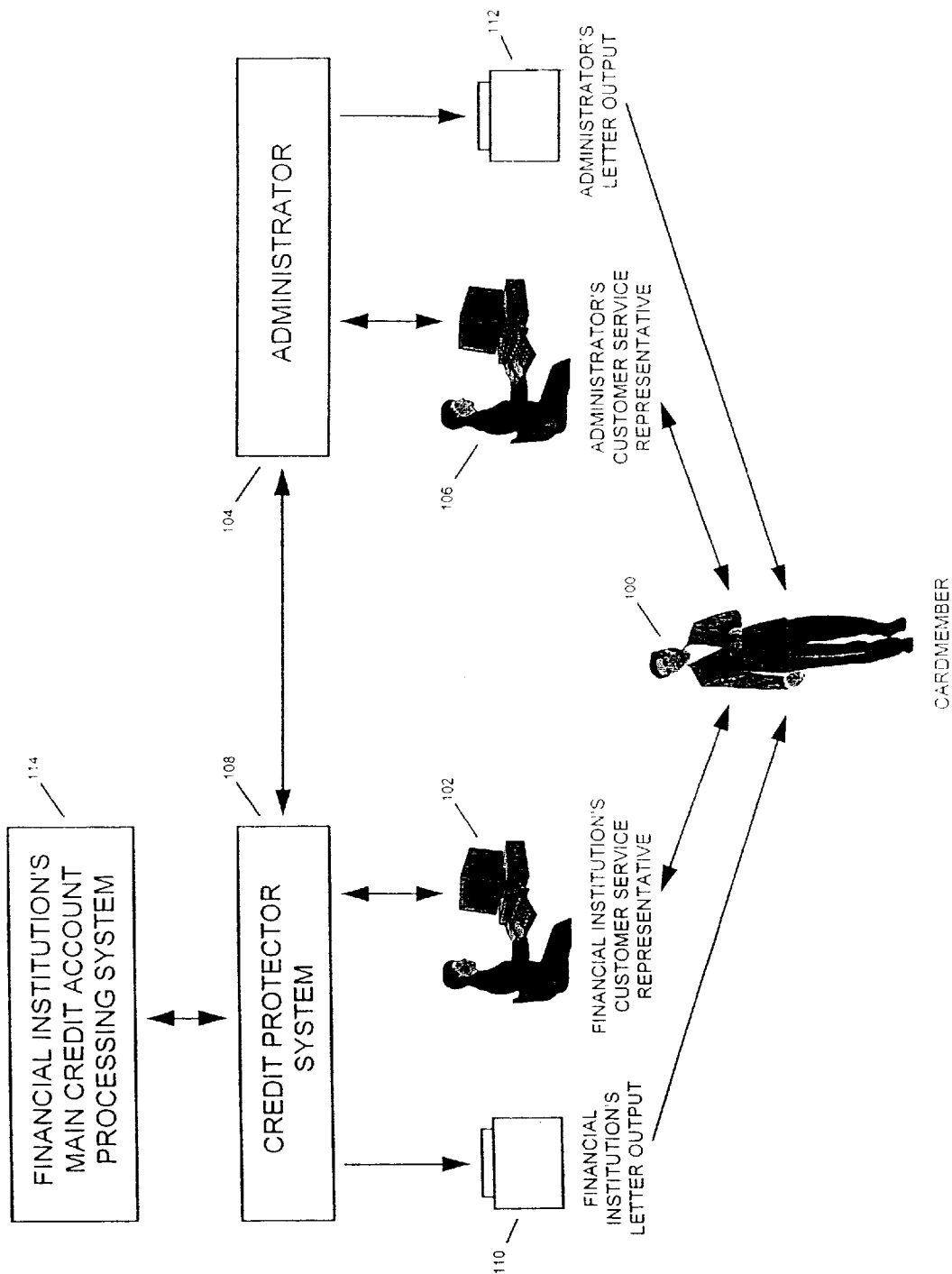
FIG. 1 shows an overview of the key components for an application of an embodiment of the debt deferment system of the present invention and illustrates the flow of information between the key components for an embodiment of the present invention.

Referring now in detail to an embodiment of the method and system of the present invention, an example of which is illustrated in the accompanying drawings, FIG. 1 shows an overview of the key components for an application of an embodiment of the present invention. The customer or cardmember 100 is the individual who has a credit account with the financial institution and who enrolls in the financial institution's credit protector program. The financial institution may interact with the cardmember 100 through a financial institution customer service representative 102 or, for example, by U.S. mail. The administrator 104 evaluates requests for activation of the deferment benefit of the credit protector program for the cardmember 100. The financial institution may act as the administrator or may contract with another entity to act as administrator. The administrator 104 may likewise interact with the cardmember 100 through an administrator's customer service representative 106 or, for example, through the U.S. mail.

In an embodiment of the present invention, the financial institution's credit protector system 108 processes enrollment applications, notifies the administrator of enrollments in the credit protector program, and processes implementation of the deferment benefits of the program. The financial institution's credit protector system 108 also automatically generates messages about the program to the cardmember 100 through a letter output 110. The administrator 104 includes a system which processes requests for activation and deactivation of the deferment benefit, transmits notices of the action taken to the financial institution, and automatically generates messages about activation and deactivation of the benefit to the cardmember 100 through a letter output 112. The financial institution and the administrator 104 interact with one another through the credit protector system 108, as well as through their respective customer service representatives. The financial institution's credit protector system 108 tracks all aspects of enrollment and implementation of deferment benefits and interacts with the financial institution's credit account processing system 114.

Figure 2:
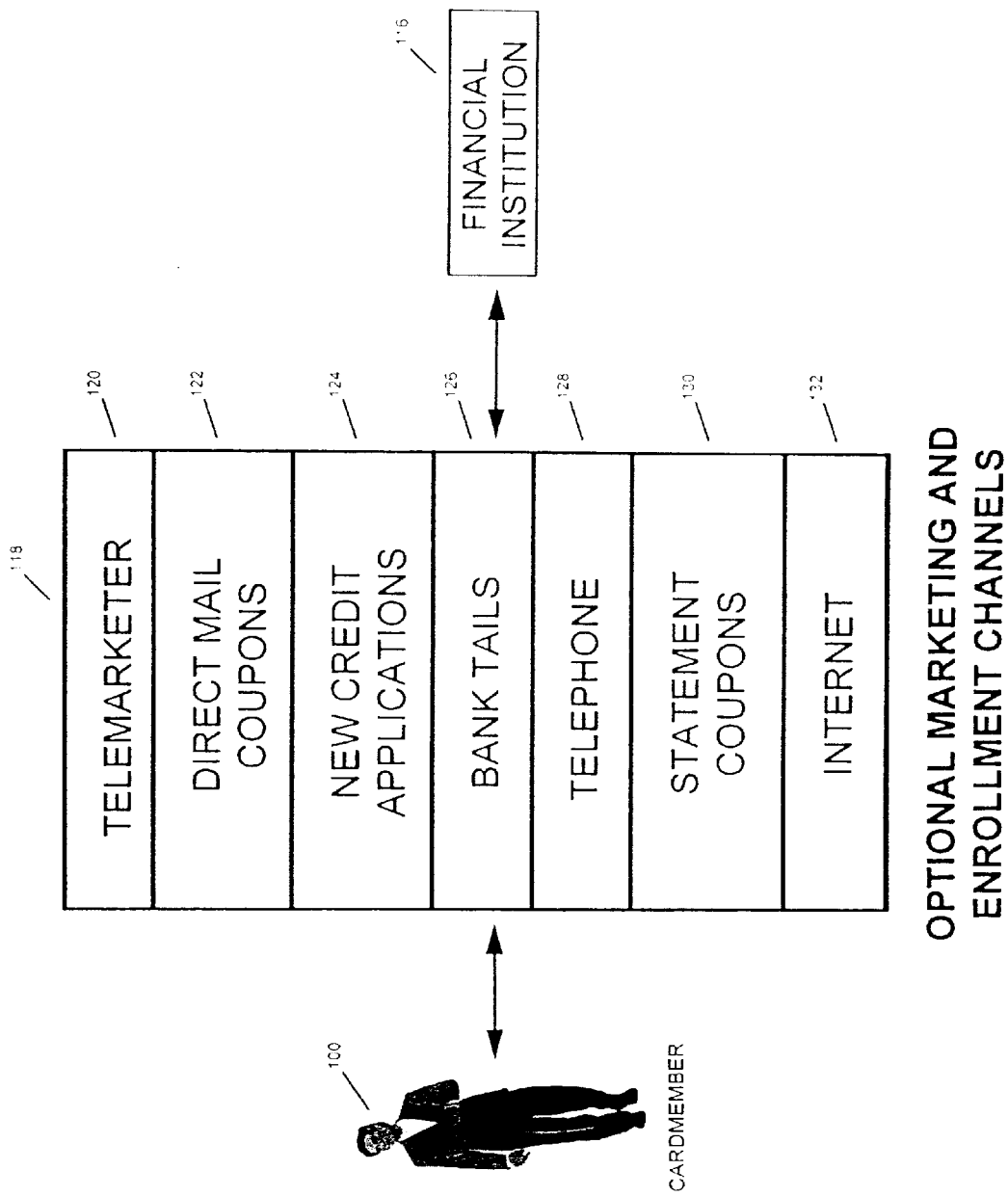
FIG. 2 amplifies the flow of information demonstrated in FIG. 1 and provides further detail regarding the flow of information between the cardmember and the financial institution through optional marketing and enrollment channels for an embodiment of the present invention.

In an embodiment of the present invention an offer of enrollment in the credit protection program is communicated to the cardmember 100, and an enrollment request may be received by the financial institution from cardmember, through various optional channels. FIG. 2 provides further detail regarding the flow of information between the cardmember 100 and the financial institution 116 through optional marketing and enrollment channels 118 for an embodiment of the present invention. An offer for enrollment in the credit protection program may be communicated to the cardmember 100, and an enrollment request may be communicated by the cardmember 100 to the financial institution, through any of the various optional channels 118. The optional marketing and enrollment channels 118 may include, for example, telemarketers 120, direct mail coupons 122, new credit application coupons 124, bangtails, 126 telephone enrollments 128 , statement coupons 130 and the Internet 132. The credit protection program is available only to cardmembers who are in good standing under the financial institution's enrollment criteria. Good standing is determined by matters such as past payment of bills and absence of payment delinquency or bankruptcy. Generally, cardmembers enrolled in a credit insurance program are not eligible for the credit protection program.

Figure 3:
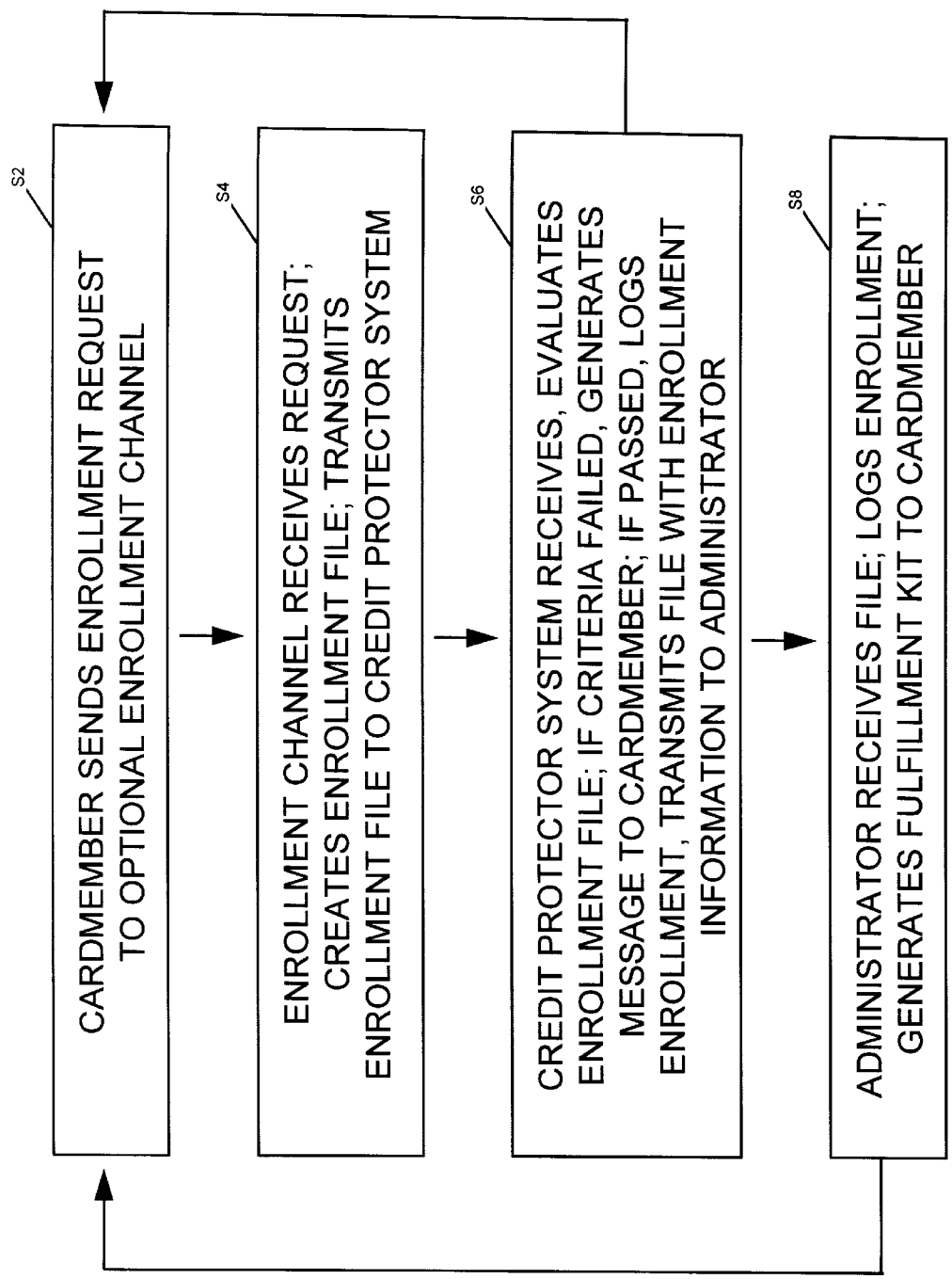
FIG. 3 is a flow chart which provides further detail regarding the flow of information in the process of the cardmember requesting enrollment in the debt deferment system through one of the optional enrollment channels for an embodiment of the present invention.

In an embodiment of the present invention, a cardmember 100 who is in good standing and who is not already enrolled in a credit insurance program is eligible to enroll in the credit protector program. The cardmember 100 may request enrollment in the credit protection program through any of the various optional channels 118. FIG. 3 is a flow chart which provides further detail regarding the flow of information in the process of the cardmember requesting enrollment through one of the optional channels 118 for an embodiment of the present invention. At S2, the cardmember 100 sends a request for enrollment in the credit protection program through any one of the optional enrollment channels 118. From any of the optional channels 118, a file feed is passed to the financial institution's credit protector system 108 for enrollment at S4. An enrollment file is automatically generated and transmitted to the credit protector system 118 from any of the channels 118 through which an enrollment request is received from the customer or cardmember 100.

Referring further to FIG. 3, at S6, the credit protector system 118 receives and evaluates the enrollment file for cardmember compliance with the financial institution's enrollment criteria. If the cardmember 100 fails the enrollment criteria, the credit protector system 118 automatically generates a letter to the cardmember declining enrollment and explaining the reason or reasons for declining the enrollment. Likewise at S6, if the cardmember 100 passes the enrollment criteria, the credit protector system 118 enrolls the cardmember 100 in the credit protection program and transmits a file with enrollment information to the administrator 104. At S8, the administrator 104 receives the file with the enrollment information and automatically sends a fulfillment kit to the cardmember 100.

FIG. 4 is a table which illustrates the categories of enrollment or cancellation information transmitted by the credit protector system to the administrator 104 for an embodiment of the present invention. The enrollment or cancellation information 134 transmitted by the credit protector system 108 to the administrator 104 includes the cardmember's account number 136, source code 138, name 140, address 142, balance 144, billing cycle 146, PID 148, SBU 150, interest 152, fees 154, minimum due 156, annual percentage rate 158, enrollment date 160, cancellation date (if applicable) 162, status code 164, and reason code 166.

Figure 7:
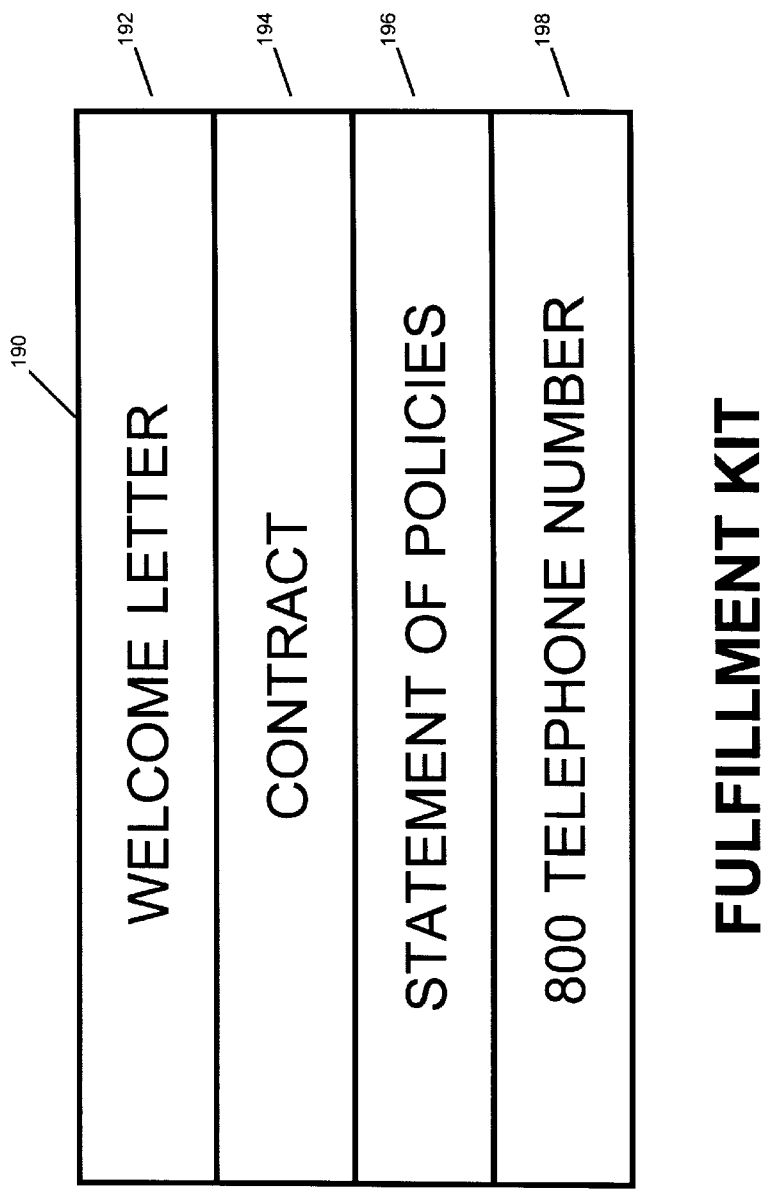
FIG. 7 is a table which demonstrates the categories of items included in the fulfillment kit automatically generated to the newly enrolled cardmember by the administrator for an embodiment of the present invention.

FIGS. 5 and 6 are tables which illustrate sample messages automatically generated to the cardmember by the credit protector system 108 for an embodiment of the present invention. For example, if the cardmember's enrollment is declined because the cardmember's account has been closed, "denied enrollment—closed account" message 180 is automatically generated to the cardmember 100. If the cardmember 100 resides in an ineligible state, "denied enrollment—ineligible state" message 172 is generated to the cardmember 100. If the account of the cardmember 100 is delinquent, "failed enrollment—account status" message 182 is generated to the cardmember 100. If the cardmember 100 has credit insurance, "denied enrollment—credit insurance" message 184 is generated to the cardmember 100. FIG. 7 is a table which demonstrates the categories of items included in the fulfillment kit automatically sent by the administrator to the newly enrolled cardmember for an embodiment of the present invention. The fulfillment kit 190 includes a welcome letter 192, a contract 194, a statement of policies 196, and an 800 telephone number 198 for the administrator's customer service representative.

In an embodiment of the present invention, the administrator 104 answers all inquiries and sends out all communications in regard to benefit inquiries, activation, enrollment, and benefit status. The administrator 104 accepts solicitations from the financial institution 116 and sets up new enrollees. The administrator 104 accepts calls from the financial institution's customer service representative 102 for retention. If the channel through which the cardmember 100 receives the offer and communicates the request for enrollment is telemarketing, the telemarketer 120 transmits a telemarketing file to the credit protector system 108 for enrollment, and the credit protector system receives the file and processes the enrollment. If the cardmember 100 fails the enrollment criteria, the appropriate one of the messages 168 is automatically generated and sent to the cardmember 100. If the cardmember 100 passes the enrollment criteria, the credit protector system 108 transmits a file to the administrator 104 with the enrollment information 134. If the channel is direct mail, direct mail coupons 122 are sent by cardmembers direct to the administrator 104. The administrator 104 creates a file and transmits the file to the credit protector system 108. The credit protector system 108 processes the enrollment. If the cardmember 100 fails the enrollment criteria, an appropriate one of the messages 168 is likewise automatically generated and sent to the cardmember 100. If the cardmember 100 passes the criteria, a file is sent by the credit protector system 108 to the administrator 104 with the enrollment information 134.

In an embodiment of the present invention, new credit account applications go through an account fulfillment system of the financial institution 116. If the channel through which the customer 100 submits an enrollment request is with a new credit application 124, the financial institution's account fulfillment system creates a file and transmits the file to the credit protector system 108. New cardmembers must have a signature for the credit protector program as well as a signature to get the card. Therefore, the account fulfillment system automatically generates "denied enrollment—need signature" message 170 to the applicant for that purpose. If the customer resides in an ineligible state, the account fulfillment system automatically generates "denied enrollment—ineligible state" message 172 to the applicant. The credit protector system 108 processes the enrollment and transmits a file with the enrollment information 134 to the administrator 104. If the enrollment channel is bangtails, they are batched to the administrator 104. The administrator 104 keys in the information and creates an enrollment file that is sent to the credit protector system 108. The credit protector system 108 processes the enrollment. If the cardmember 100 fails the enrollment criteria, one of the appropriate messages 168 is automatically generated and sent to the cardmember 100. If the cardmember 100 passes the criteria, a file is sent to the administrator 104 with the enrollment information 134.

The enrollment channel may also be by telephone to the financial institution's customer representative 102 or to the administrator's customer representative 106. In either case, an enrollment file is created and transmitted to the credit protector system 108. The credit protector system 108 processes the enrollment and transmits a file with the enrollment information 134 to the administrator 104. If the channel is onstatement enrollment, a statement coupon 130 is returned by the cardmember 100 to the payment processing system of the financial institution 116. The financial institution's payment processing system creates and transmits an enrollment file to the credit protector system 108. The credit protector system 108 processes the enrollment and transmits a file with the enrollment information 134 to the administrator 104. The enrollment channel may also be through the Internet, for example, by the cardmember 100 at a terminal transmitting an electronic mail request for enrollment to the financial institution's customer service representative 102. An enrollment file is created and transmitted to the credit protector system 108. The credit protector system 108 processes the enrollment and transmits a file with the enrollment information 134 to the administrator 104.

Figure 8:
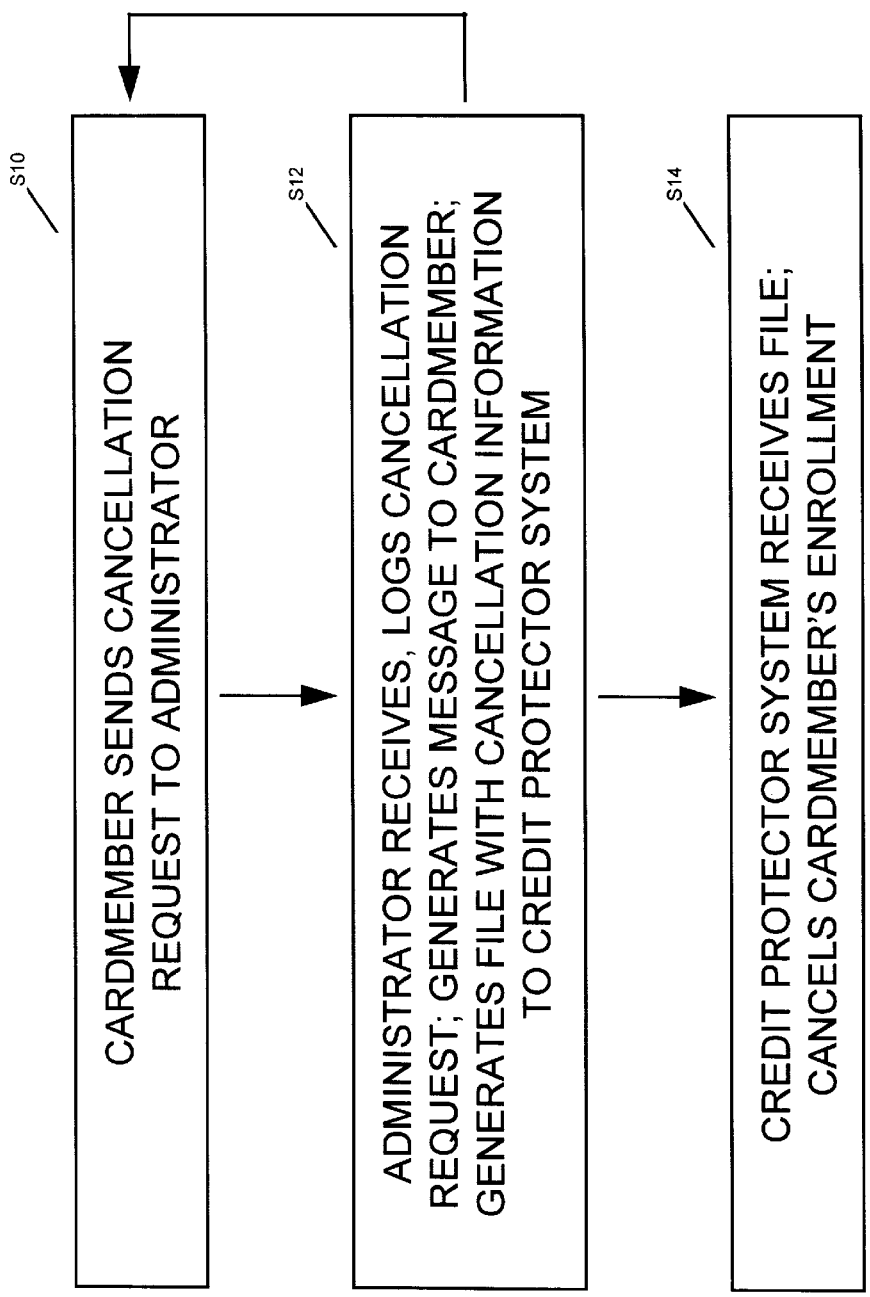
FIG. 8 is a flow chart which provides further detail regarding the flow of information in the process of the cardmember canceling the cardmember's enrollment in the credit protection program for an embodiment of the present invention.

In an embodiment of the present invention, the cardmember 100 may cancel the enrollment. If canceled within the first 30 days of enrollment, the cardmember 100 will receive a credit. FIG. 8 is a flow chart which provides further detail regarding the flow of information in the process of the cardmember canceling the enrollment. At S10, the cardmember 100 sends a cancellation request to the administrator 104. The cardmember 100 may also cancel the enrollment by telephoning the financial institution's customer representative 102, in which case, the call is transferred to the administrator's customer representative 106. If the administrator's customer representative 106 is not available, the financial institution's customer representative 102 may handle the call. Alternatively, the cardmember 100 may cancel the enrollment by writing a letter to the financial institution 116. In any case, at S12, the administrator 104 receives and processes the request and automatically generates "canceled by cardmember" message 178 to the cardmember 100. The administrator 104 also transmits a file to the credit protector system 108 with the cancellation information 134. At S14, the credit protector system 108 receives the file with the cancellation information 134 and cancels the cardmember's enrollment in the credit protection program.

In an embodiment of the present invention, the financial institution 116 may cancel the cardmember's enrollment under certain conditions such as delinquency in the cardmember's credit account, bankruptcy, changing residence by the cardmember to a foreign country or closing the credit account. The financial institution's credit protector system 108 tracks the status of the cardmember's account or accounts, and an adverse event such as bankruptcy, residency change, or closing the cardmember's credit account, automatically prompts the credit protector system 108 to cancel the cardmember's enrollment in the credit protection program and to generate an appropriate message to the cardmember 100 such as "canceled enrollment" message 174 or "canceled—out of U.S." message 176. The credit protector system 108 also automatically transmits a file with the cancellation information 134 to the administrator 104, and the administrator 104 receives the file and logs the cardmember's enrollment cancellation. The cancellation of enrollment is effective immediately. Additionally, the credit protector system 108 automatically generates statement messages to be printed on the cardmember's credit account statements. FIG. 9 illustrates sample statement messages 200 automatically printed on the cardmember's account statement with information about the credit protection program. When the cardmember's enrollment is canceled, "cancellation of enrollment" message 208 is automatically printed on the next bill to the cardmember 100. The cardmember's enrollment may thereafter be reinstated, for example, if the delinquency is cured. Upon reinstatement of enrollment, "reinstatement of enrollment" message 212 is automatically printed on the next bill to the cardmember 100.

In an embodiment of the present invention, the cardmember 100 must be enrolled in the credit protection program for a predetermined period of time, such as three months, before requesting activation of the deferment benefits of the program. After activation, during the deferment period, no finance charges, late charges, or charges for the credit protection program are incurred. The charge for the credit protection program is based on a percentage of the cardmember's average daily balance or outstanding balance, depending on the particular credit account. For example, the charge may be fixed at a sum, such as 49 cents per $100 of either the average daily balance or the outstanding balance on the credit account. The deferment period has predetermined maximum and minimum time limits, for example, a maximum duration, for example, of 24 months or billing cycles per occurrence, and a minimum duration of one billing cycle. For some occurrences such as family leave, the maximum time limit may be limited, for example, to 3 months.

In order to be eligible to activate the deferment benefit of the credit protection program, the cardmember 100 must be enrolled for a predetermined time, such as at least 3 months, and must be enrolled at the time of notification of activation and at the time of the event which is the reason for activation. Only the primary cardmember 100 can activate the benefit by telephone to the financial institution 116. If the person reporting the event by telephone is not the cardmember 110, then the benefit will not be activated until the event has been verified in writing. Otherwise, anyone directed by the person covered by the benefit can activate the benefit. The primary cardmember is always covered by the benefit, but the cardmember 100 may also activate the benefit if a member of the cardmember's household, who is the spouse, child, or parent of the cardmember residing in the same household and having the highest earned income in the household, becomes involuntarily unemployed, disabled, hospitalized, or takes family leave.

The cardmember 100 may activate the benefit when the cardmember, or the member of the household with the highest earned income, becomes hospitalized, involuntarily unemployed, or disabled, or takes family leave. In order to activate the benefit, the cardmember 100 must notify the financial institution 116 within a certain time, such as 90 days of the occurrence. The cardmember 100 may notify the financial institution 116 by telephoning the financial institution's customer service representative 102, in which case, the financial institution's customer representative transfers the call to the administrator's customer representative 106. The cardmember 100 may also call the administrator's customer representative 102 direct at the 800 number included in the fulfillment kit 190. Upon receipt of the notification, the administrator's customer service representative 106 attempts to verify the unemployment, disability, hospitalization or family leave by telephone, if possible. The administrator's customer service representative 102 may also notify the cardmember 100 that any pre-arranged scheduled cardmember payments currently being billed to the cardmember's credit account will be declined and advise the cardmember to notify any merchants with whom such arrangement exists. Verification documentation is automatically generated and sent to the cardmember 100 by the administrator 104, and the administrator automatically transmits a notification of initiation of the benefit to the credit protector system 108.

In an embodiment of the present invention, in order to be eligible for activation of the unemployment benefit of the credit protection program, the cardmember 100, or the member of the cardmember's household who has the highest earned income, must have been employed full time, for example, for 30 hours per week for a certain period, such as 90 consecutive days by someone other than himself or herself prior to becoming unemployed and must become involuntarily unemployed, for example, for at least 30 consecutive days or qualify for unemployment benefits under state unemployment laws. The cardmember 100 must provide verification of such loss of employment. Activation of the unemployment benefit is denied if the cardmember 100, or the member of the household with the highest earned income, resigned, retired, was employed for seasonal work, or was fired for cause. Activation of the unemployment benefit is also denied if the cardmember 100, or the member of the household with the highest earned income, fails to provide verification.

In order to be eligible for activation of the disability benefit, the cardmember 100, or the member of the household with the highest earned income, must be disabled, for example, for at least 30 consecutive days or be expected to have a disability which causes the cardmember, or the member of the household, to be unable to perform normal duties. Pregnancy may be covered if the pregnancy disables the cardmember 100. In order to be eligible for activation of the disability benefit, the cardmember 100 or household member must be under a physician's care. Employment is not a condition of activation of the disability benefit. Activation of the disability benefit is denied if the cardmember 100, or member of the household, has a self-inflicted injury, has been treated for the same disability within a predetermined period, for example, 6 months, before enrollment in the credit protection program, or if the benefit has been canceled at the time of occurrence of the disability. Activation of the disability benefit is also denied if the cardmember 100, or the member of the household, fails to provide verification.

In an embodiment of the present invention, in order to be eligible for activation of the hospitalization benefit, the cardmember 100, or the household member, must be hospitalized for a predetermined number of consecutive days, such as 5 or more days. No employment is required for activation of the hospitalization benefit. Hospitalization must be in an acute care hospital, convalescent home, nursing home, psychiatric facility, drug treatment facility, or hospice. Activation of the hospitalization benefit requires the cardmember 100 to provide verification. Activation of the hospitalization benefit is denied if the cardmember 100, or the household member, has a self-inflicted injury or fails to provide verification. In order to be eligible for the family leave benefit, the cardmember 100 must take an unpaid leave of absence from work to care for an immediate family member, including a parent, child or spouse, for birth or adoption of a child or care of the sick family member. The cardmember 100 must furnish written verification from the employer that unpaid leave was taken. The maximum duration of the family leave benefit is, for example, 3 months. Activation of the family leave benefit is denied if the cardmember 100 fails to provide verification.

A retired cardmember 100 who is not employed and does not receive a pay stub may likewise be eligible for unemployment, hospitalization or disability benefits, provided the retired cardmember (who may have some earned income) resides with someone in the same household who is employed and earns the highest earned annual income. The retired cardmember 100 is eligible to activate the appropriate benefit if the member of the household becomes unemployed, hospitalized or disabled, or takes family leave according to the same criteria as for an employed cardmember. The retired cardmember 100 may also activate the hospitalization or disability benefit if the cardmember becomes disabled or hospitalized. A self-employed cardmember 100 may also be eligible to activate the hospitalization or disability benefit if the cardmember or the member of the household cannot perform normal duties due to the disability or hospitalization. The self-employed cardmember 100 may also activate the unemployment benefit if the member of the household having the highest earned income becomes unemployed and meets the same criteria as for an employed cardmember.

In an embodiment of the present invention, the administrator 104 accepts requests for activation by telephone and notifies the financial institution 116 of the action taken. The administrator 104 tracks all enrollments, activations, declines and the like by channel. The administrator 104 verifies monthly continuing benefits documents. Requests by cardmembers for cancellation of enrollment are handled by a retention unit of the administrator 104, which makes attempts to keep the cardmember 100 enrolled. The administrator 104 validates eligibility to determine when the deferment period ends, and the administrator 104 transmits all updates to the financial institution 116 daily. In order to identify the credit protector status for credit accounts in various stages, the financial institution 116 tracks various categories of information about the deferment.

Figure 11:
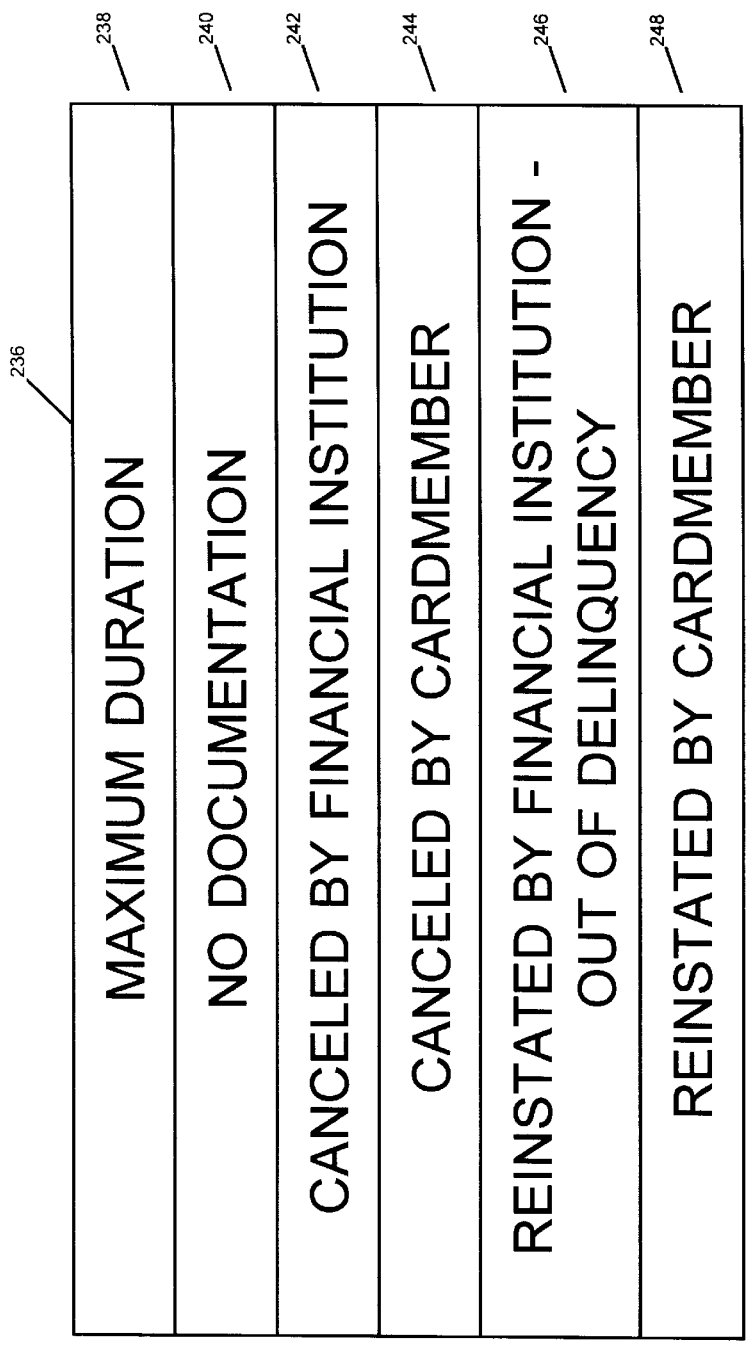
FIG. 11 is a table which demonstrates reason codes utilized by the financial institution in tracking the status of the cardmember's deferment benefits for an embodiment of the present invention.

FIG. 10 is a table which demonstrates the categories of information 216 about the cardmember's credit protection status tracked by the financial institution 116 and transmitted between the financial institution's credit protector system 108 and the administrator 104 for an embodiment of the present invention. The cardmember's credit protection status is tracked by date of enrollment 218, date of activation 220, date of deactivation 222, date of re-activation 224, date of notification 226, date of event 228, paid-up date, such as 7 years paid-up date 230, type of deferment 232, including family leave, unemployment, disability, or hospitalization, and number of activations 234. A number of reason codes are used in tracking the status of the deferment benefits of the cardmember's credit protection. FIG. 11 is a table which demonstrates the various reasons codes 236 utilized in tracking the status of the cardmember's deferment benefits. The reason codes 236 include maximum duration 238, no documentation 240, canceled by financial institution 242, canceled by cardmember 244, reinstatement by financial institution 246, and reinstated by cardmember 248.

In an embodiment of the present invention, if the cardmember 100 activates in the middle of a billing cycle, the interest from the last billing cycle is added to the balance on the cardmember's credit account, and the minimum balance for the current billing cycle will not be required to be paid. The account will be cured as soon as it goes into activation.

If the cardmember 100 deactivates in the middle of a billing cycle, the account will not start accruing interest until the next billing cycle. The financial institution 116 tracks the number of months enrolled by the paid-up counter, such as the 7 years paid-up counter. If the enrollment is canceled for a cardmember 100, the counter is reset at zero. The deferment period starts from the date that the administrator 104 transmits the activation status to the financial institution 116.

After a predetermined period of enrollment by the cardmember 100 in the credit protection program without activation of, for example, 7 years without activation, the benefit of the program is free to the cardmember. Thus, for example, after 7 years without activation, the financial institution automatically generates a letter with the "7 years notice" message 188 notifying the cardmember 100 that the credit protection benefit is free. The benefit may also be extended to a member of the cardmember's household with the highest annual earned income in the household. The administrator 104 may cancel the deferment period if the cardmember 100, or the member of the household with the highest income, misrepresents documentation, fails to provide written proof on a monthly or bimonthly basis, or if the deferment period ends. The administrator 104 transmits the appropriate one of the reason codes 236 to the financial institution 116 indicating cancellation of the deferment period and automatically generates a letter to the cardmember 100 with notification of the cancellation and the reason for cancellation.

In an embodiment of the present invention, the financial institution 116 transmits files to the administrator 104, and the administrator transmits files to the financial institution on a daily basis. The financial institution 116 also solicits cardmembers for enrollment and enrolls cardmembers in the credit protection program. The financial institution 116 notifies the administrator 104 of potential claims and claim types as part of the daily transmission to the administrator 104 with information, and also sends documentation to the administrator. The financial institution 116 bills fees on accounts and answers questions about billing and collections. The financial institution 116 transmits cancellation of enrollment requests to the administrator 104, processes cancellations and fee refunds, and changes account status when notified of bankruptcies.

When the deferment period begins, the financial institution 116 sends a message to the cardmember 100 that the benefit is in effect. A status code 164 and new reason code 166 are updated to close the credit account. The credit account freezes (minimum due zero) for the first billing cycle after the cardmember 100 notifies the administrator 104 and the administrator activates the benefit, and statements on the credit account continue to have a zero minimum due for the duration of the deferment. Fees for the credit protection program are also waived for the duration of the deferment. Benefit forms are verified on a monthly basis. No new credit cards are issued during the deferment period, and the credit account is placed in a special collections queue for active credit protector accounts.

In an embodiment of the present invention, once the deferment period begins, the financial institution 116 stops billing and aging of the account. When the deferment period ends, the financial institution 116 resumes billing and changes the credit protector indicator dates. The financial institution 116 prevents negative account reporting to the credit bureau. The financial institution 116 accepts files from the administrator 104 to update accounts accordingly. Accounts that are in the financial institution's collections queue after deferment are worked by collections customer service representatives of the financial institution and are evaluated. Dispute issues are handled manually, and fees may be charged back. The financial institution 116 redirects calls to the administrator's customer representative 106 where appropriate. Accounts are cured by the financial institution 116 once activated. During the deferment period, a statement is sent to the cardmember 100 every month, but the minimum due on the statement is zero. No interest or late fee charges accrue on the credit account, and the balance reflects purchases, payments, penalty charges for dishonored checks, and the like. The credit account is cured when the benefit is activated. "Deferment" statement message 202 is automatically generated and added to the cardmember's credit account statement each month, and a counter is added for every month.

Figure 12:
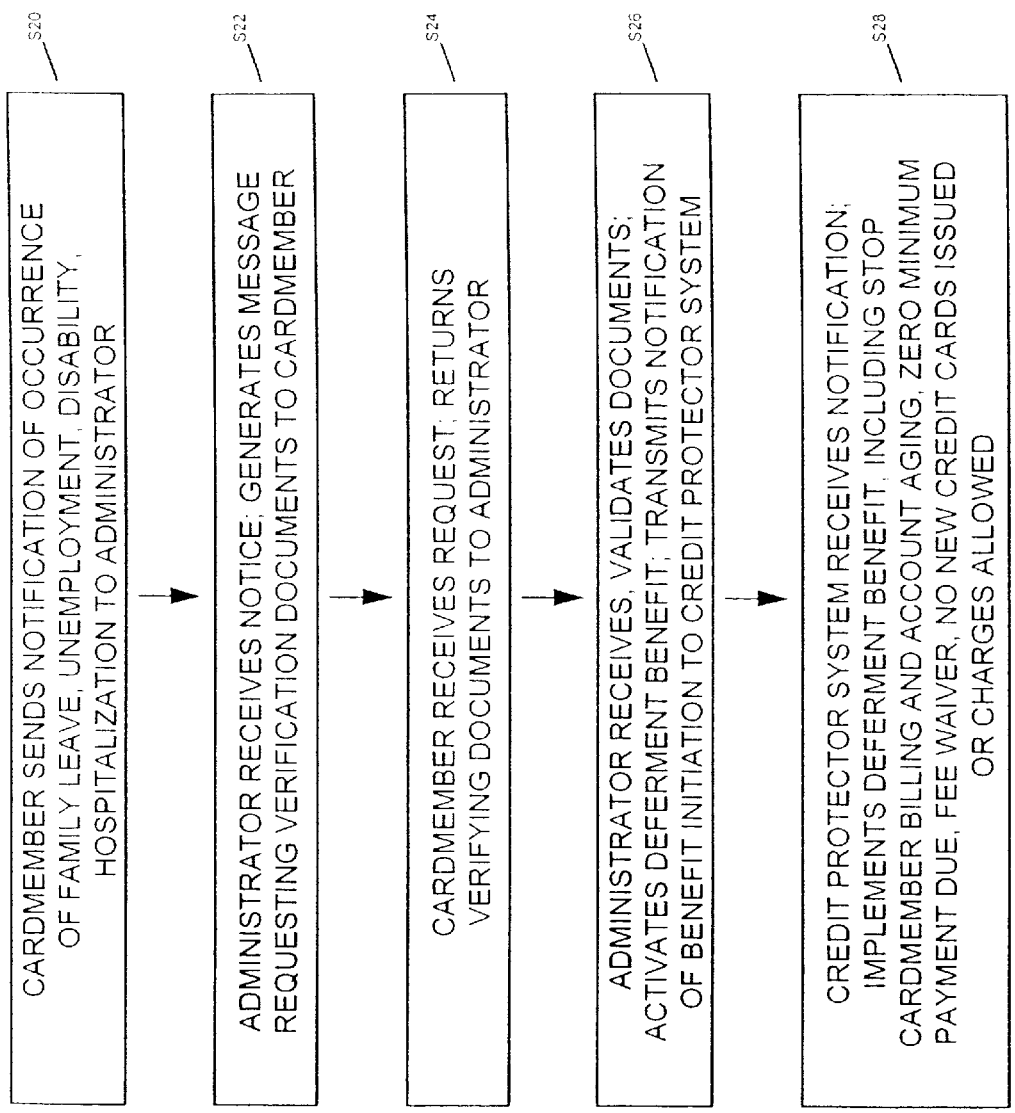
FIG. 12 is a flow chart which provides further detail regarding the flow of information in the process of the cardmember activating the deferment benefit of the credit protection program for an embodiment of the present invention.

FIG. 12 is a flow chart which provides further detail regarding the flow of information in the process of the cardmember 100 activating the deferment benefit of the credit protector for an embodiment of the present invention. At S20, the cardmember 100 sends notice of the occurrence of family leave, unemployment, disability, or hospitalization to the administrator 104. At S22, the administrator 104 receives the notice and automatically generates a message to the cardmember 100 requesting verification documents verifying the occurrence and requesting the cardmember to complete and return the verification documents to the administrator 104 within 30 days. At S24, the cardmember 100 receives the request and completes and returns the verification documents to the administrator 104. At S26, the administrator 104 receives and confirms that the cardmember's verification documents are valid and certifies that the cardmember 100 is hospitalized, unemployed, disabled, or on family leave and automatically transmits a notification of benefit initiation to the credit protector system 108.

Referring further to FIG. 12, at S28, the credit protector system 108 receives the notification and automatically causes the cardmember's credit account to stop aging. The next billing cycle will show a minimum payment due of zero, all fees including fees for the credit protection program are waived, and no new credit cards will be issued to the cardmember 100. The credit account is then processed by the financial institution 116 as a credit protector account that has been verified and activated. However, if the administrator's customer service representative 106 determines that the verification documents are not valid, a letter is sent to the cardmember 100 by the administrator 104 declining activation of the benefit and explaining why the benefit was not activated. The administrator 104 transmits information regarding declining of the activation to the financial institution 116, and the financial institution updates its files. If after being notified of activation of the benefit, the financial institution 116 determines that the cardmember 100 is not in good standing the information sent to the credit bureau is revised. The administrator 104 transmits updated files to the financial institution 116 on a daily basis, and the financial institution transmits updated files daily to the administrator for new enrollees and changes in credit protector account status.

In an embodiment of the present invention, the deferment period ends when the cardmember 100 or other member of the household is re-employed, no longer disabled, leaves the hospital or resumes work after family leave, or if the cardmember fails to provide verification. The appropriate one of the statement messages 200 is automatically generated and added to the cardmember's credit account statement for each of those situations. The deferment period also ends when the predetermined maximum duration, such as 24 months, has passed, in which case, "end of activation" message 206 is automatically generated by the credit protector system 108 and added to the account statement. The credit protector system 108 likewise automatically generates and sends the cardmember 100 a letter with "program ended" message 186. In the meantime, for example, at 23 months, "23rd month" message 204 is also automatically generated and added to the cardmember's credit account statement. The administrator 104 may also send a letter to the cardmember 100, for example, at 23 months.

When the deferment period ends, all the cardmember's accounts are reopened, and all the accounts go into a recovery queue. If the accounts are not in good standing, a recovery unit of the financial institution 116 reduces the credit line to an amount in excess of the balance, for example, $200 greater than the balance. If the cardmember 100 is re-employed, the cardmember must furnish information about the new employer to the administrator's customer service representative 106. If the cardmember 100 is no longer disabled or is no longer in a hospital, or no longer on family leave, the cardmember must notify the administrator's customer service representative 106 to cancel the deferment. The administrator's customer service representative 106 then updates the file to change the status to cancel the deferment and transmits the update to the financial institution 116.

In an embodiment of the present invention, upon receipt of the update, the financial institution 116 updates the status code 164 of the account so that the cardmember 100 can resume charging purchases to the credit account. The message on the cardmember's account statement is automatically changed to "cancellation of activation" message 210. Interest and late fee charges on the credit account resume, and charges for the credit protection program resume. A letter is automatically generated, for example, with "24 months notice program ended" message 186 and sent to the cardmember 100 informing the cardmember that the account is active, is out of deferment, and that the next minimum due on the statement must be paid. All accounts are reopened, and all accounts go into the recovery queue. If the accounts are in not in good standing, the recovery unit of the financial institution 116 will reduce the credit line for the accounts to no more than, for example, $200 greater than the balance. All accounts are reopened and go into the new recovery queue. If the accounts are in not in good standing, the recovery queue will reduce the credit line, for example, to $200 greater than the balance.

Figure 13:
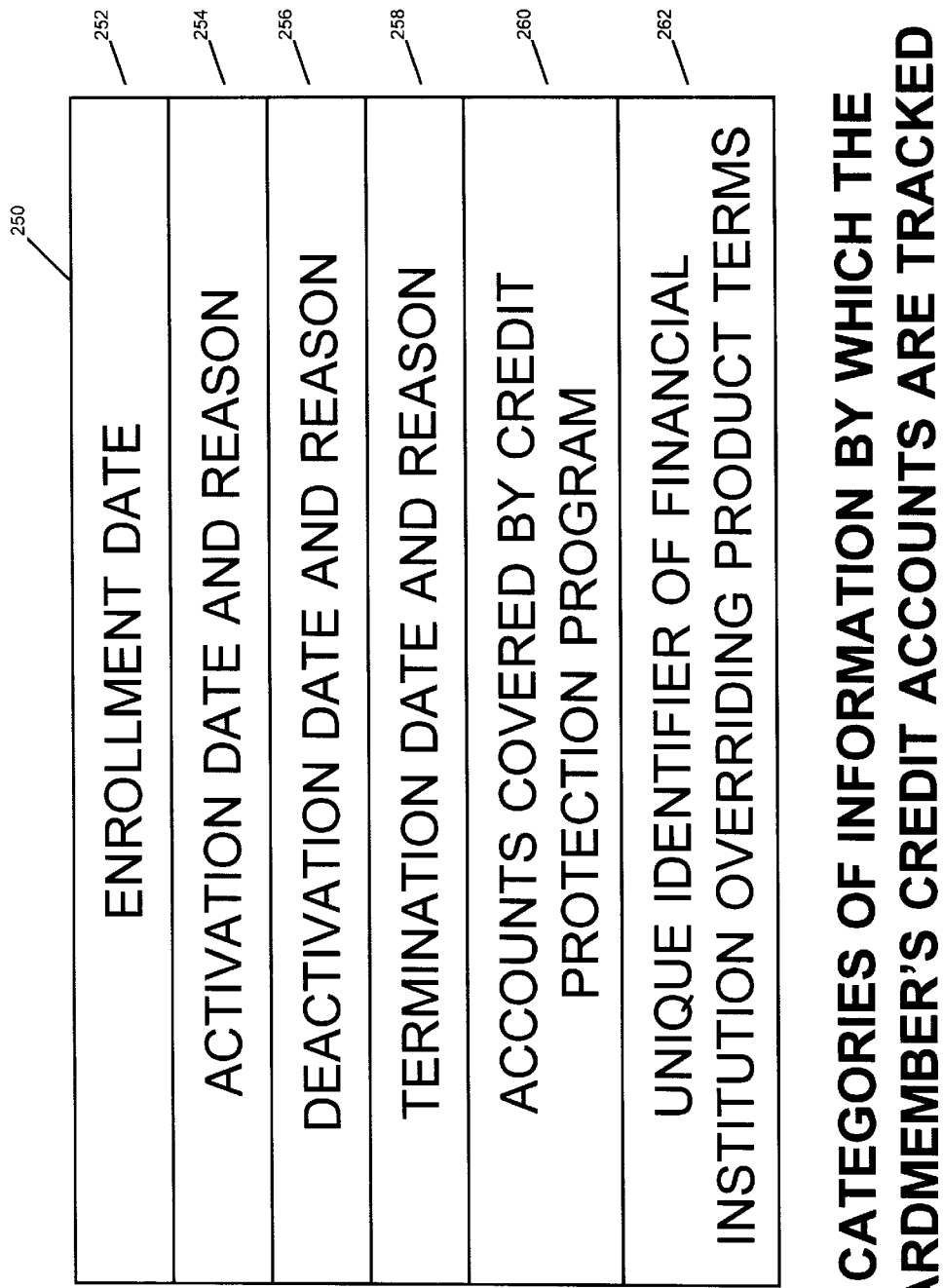
FIG. 13 is a table which illustrates categories of information by which the cardmember's credit account is tracked for an embodiment of the present invention.

In order to identify credit protector period status for credit accounts in various stages, the financial institution 116 tracks the deferment for credit accounts according to the categories of credit protector status 216 and utilities the reason codes 236 in tracking the deferment status. The cardmember's credit accounts are tracked by, and the recovery unit of the financial institution 116 has the capability to access, various fields at the account level. FIG. 13 is a table illustrating the categories of information 250 by which the cardmember's credit account is tracked, and which fields are accessible by the financial institution's recovery unit for an embodiment of the present invention. The categories include enrollment date and reason 252, activation date and reason 254, deactivation date and reason 256, termination date and reason 258, cardmember's accounts covered by credit protection 260, and the unique identifier of the financial institution's overriding product terms 262.

In an embodiment of the present invention, the financial institution 116 transmits a file to the administrator 104 if there is any activity on an account that is enrolled. For enrollment or cancellations, the financial institution 116 transmits a file to the administrator 104 that contains the enrollment or cancellation information 134. The administrator 104 also transmits a file to the financial institution 116 that updates the account, if the account is activated, deactivated, enrolled, or canceled. The date of enrollment, date of benefit activation, date benefit activation ends, date deferment is canceled, date benefit is canceled, and date benefit is reinstated is tracked, as well as the reasons for any change in status. Each account is identified by an indicator which identifies the status of the account as it pertains to the credit protector benefit. On-line screens use the indicator, which is a global element, to display information about the benefit, prompt talk-offs, send letters, and the like. From the time the deferment benefit is activated for the cardmember 100 and during the deferment period, the cardmember's account does not age, no collection letters are sent, no negative credit bureau reporting transpires, no interest or late fees are charged, and all purchases or cash advances are declined. In an embodiment of the present invention, two indicators are used for the financial institution's collection system, namely "active" and "first payment default". Also, a queue for "active" accounts is utilized by the financial institution's collection system.

Figure 14:
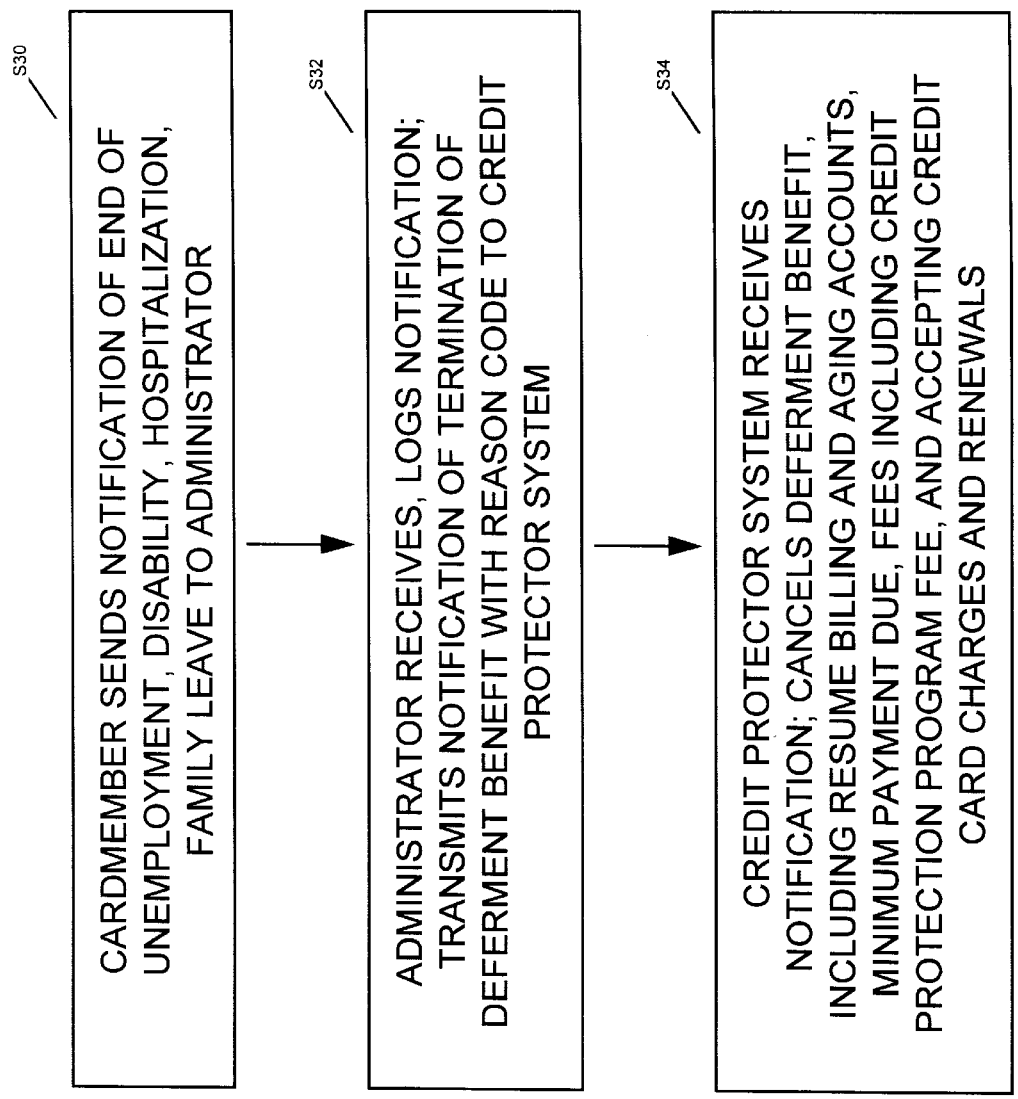
FIG. 14 is a flow chart which provides further detail regarding the flow of information in the process of the cardmember deactivating the deferment benefit of the credit protection program for an embodiment of the present invention.

FIG. 14 is a flow chart which provides further detail regarding the flow of information in the process of deactivating the deferment benefit of the credit protection program for an embodiment of the present invention. At S30, the cardmember 100 sends notification of the end of unemployment, disability, hospitalization, family leave to the administrator 104. The administrator 104 receives, logs the notification; automatically transmits a notification of termination of the deferment benefit with a reason code to the credit protector system 108 at S32. The credit protector system 108 receives the notification; cancels the deferment benefit, including resuming billing and aging of account, minimum payment due, credit protection program and other fees, and accepting credit charges and credit card renewals.

Various preferred embodiments of the invention have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the present invention. Accordingly, the invention is only limited by the following claims.

What is claimed is:

1. A method of debt deferment for at least one credit account of a customer of a financial institution, comprising:

marking a file by a credit protection system server of the financial institution for at least one credit account of the customer of the financial institution with information about enrollment of the customer for activation of a deferment benefit on the account upon verification of an event consisting of one of the customer and a household member of the customer involuntarily becoming at least one of unemployed, hospitalized, disabled, and on family leave, and sending the enrollment information to an administrator;

receiving information for the customer by the administrator about verification of the event, and sending notice of verification of the event to the credit protection server by the administrator; and automatically marking the account file by the credit protection system server with an indicator for activation of the deferment benefit consisting of at least one of a zero minimum payment due, no adverse credit reporting, no fee accrual, and no new credit card charges on the account, and marking the account file by the credit protection system server with a maximum deferment benefit duration date counter.

2. The method of claim 1, wherein the server comprises a mainframe computer.

3. The method of claim 1, further comprising billing the customer a fee for the enrollment.

4. The method of claim 3, wherein billing the customer a fee further comprises billing a predetermined percentage of an average outstanding balance on the credit account.

5. The method of claim 4, wherein billing a predetermined percentage further comprises billing up to a predetermined maximum amount.

6. The method of claim 1, wherein marking the file with enrollment information further comprises marking the file with a maximum fee charge date counter.

7. The method of claim 6, further comprising the maximum fee charge date counter automatically marking the account file with a fee charge paid up indicator.

8. The method of claim 1, further comprising the financial institution automatically sending a notice of the activation of the deferment benefit to the customer.

9. The method of claim 1, further comprising the maximum benefit duration date counter automatically marking the file with an indicator for deactivation of the deferment benefit.

10. The method of claim 1, further comprising transmitting information about termination of the event for the customer to the financial institution.

11. The method of claim 10, further comprising the financial institution automatically marking the file with an indicator for deactivation of the deferment benefit.

12. The method of claim 1, wherein marking the file with enrollment information further comprises sending a request for enrollment with the enrollment information for the customer.

13. The method of claim 12, further comprising sending the request to the financial institution.

14. The method of claim 13, further comprising sending the request through an enrollment channel of the financial institution.

15. The method of claim 14, wherein the enrollment channel comprises one of a telemarketer, a direct mail coupon, a credit application, a bangtail, a customer service representative on a telephone, a statement coupon, and a computer network.

16. The method of claim 14, further comprising sending the request to a credit protector system of the financial information.

17. The method of claim 16, further comprising the credit protector system automatically processing the request for enrollment for the customer.

18. The method of claim 1, further comprising the customer transmitting the information about verification of the event to the administrator.

19. The method of claim 1, further comprising the administrator automatically sending a fulfillment kit for the enrollment to the customer.

20. The method of claim 1, wherein the administrator comprises a server.

21. The method of claim 20, wherein the server comprises a mainframe computer.

22. The method of claim 1, further comprising the financial institution marking the file with information about cancellation of enrollment for deferment of debt on the account.

23. The method of claim 22, wherein marking the file with the cancellation information further comprises the financial institution analyzing adverse credit information about the customer.

24. The method of claim 22, wherein marking the file with the cancellation information further comprises sending the cancellation information for the customer to the financial institution.

25. The method of claim 22, further comprising the financial institution automatically sending a notice of the cancellation to the customer.

26. The method of claim 22, further comprising the financial institution marking the file with information about re-enrollment for deferment of debt on the account.

27. A system of debt deferment for at least one credit account of a customer of a financial institution, comprising:
    means for marking a file for at least one credit account of the customer of the financial institution by a credit protection system server of the financial institution with information about enrollment of the customer for activation of a deferment benefit on the account upon verification of an event consisting of one of the customer and a household member of the customer involuntarily becoming at least one of unemployed, hospitalized, disabled, and on family leave, and sending the enrollment information to an administrator;
    means for receiving information for the customer by the administrator about verification of the event, and sending notice of verification of the event to the credit protection server by the administrator; and
    means for automatically marking the account file by the credit protection system server with an indicator for activation of the deferment benefit consisting of at least one of a zero minimum payment due, no adverse credit reporting, no fee accrual, and no new credit card charges on the account, and marking the account file by the credit protection system server with a maximum deferment benefit duration date counter.

28. The system of claim 27, wherein the server comprises a mainframe computer.

29. The system of claim 28, wherein the transmitting means comprises a computer network.

30. A method of providing debt deferment to a debtor, comprising:
    establishing conditions for enrollment of a debtor in a debt deferment program which includes a debt deferment benefit;
    establishing conditions for continued membership in the debt deferment program which must be met by the debtor if the debtor has not satisfied conditions for vesting of the debt deferment benefit;
    establishing conditions for vesting of the debt deferment benefit whereby the debtor obtains the right to activate the debt deferment benefit after the debtor has satisfied the conditions for vesting;
    establishing conditions for activation of the debt deferment benefit;
    enrolling the debtor into the debt deferment program who has met the conditions for enrollment; and
    permitting the debtor to activate the debt deferment benefit when the conditions for activation have been met by the debtor and the debtor has met either the conditions for continued membership in the debt deferment program or the conditions for vesting of the debt deferment benefit.

31. A method of providing debt deferment to a credit card holder, comprising:

establishing conditions for enrollment of a credit card holder in a debt deferment program which includes a debt deferment benefit;

enrolling the credit card holder into the debt deferment program who meets the conditions for enrollment;

charging the credit card holder who is enrolled in the debt deferment program a fee for participation in the debt deferment program which is proportional to the amount of the debt owed by the credit card holder;

establishing conditions for vesting of the debt deferment benefit whereby the credit card holder will be entitled to activate the debt deferment benefit without continued payment of the fee for participation in the debt deferment program;

establishing conditions for activation of the debt deferment benefit; and permitting the credit card holder to activate the debt deferment benefit when the conditions for activation and either the condition for vesting has been satisfied or the credit card holder has paid the fee for participation in the debt deferment program.

* * * * *